2,959,836
TUNNEL KILN COOLING SECTION

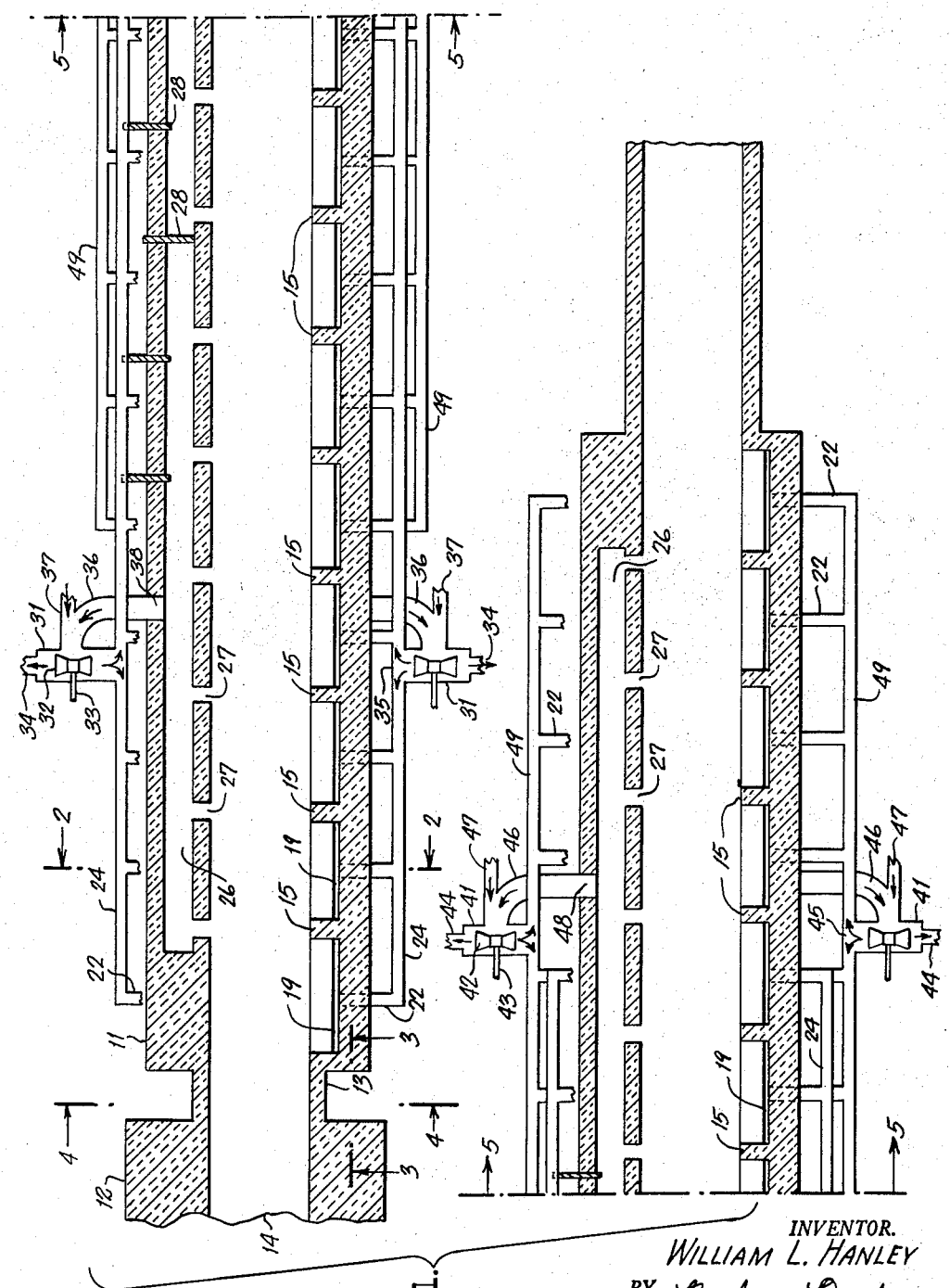

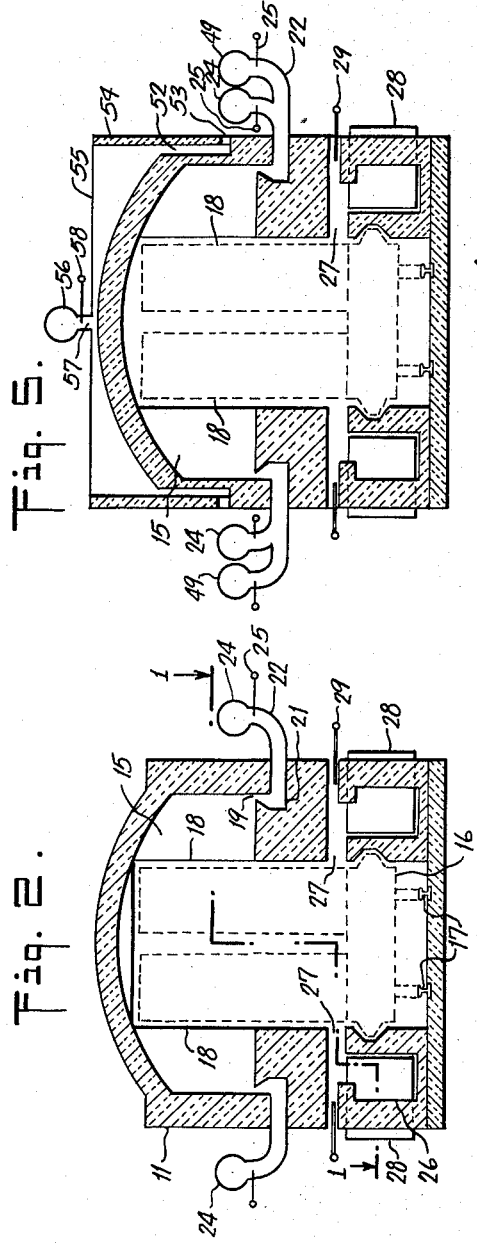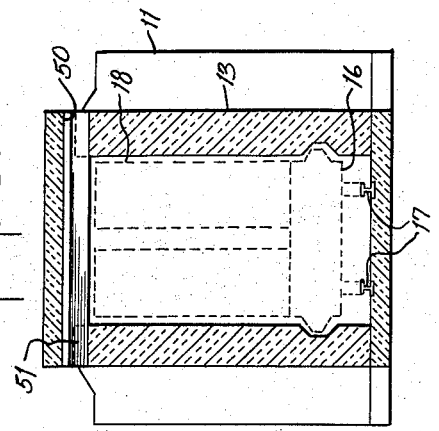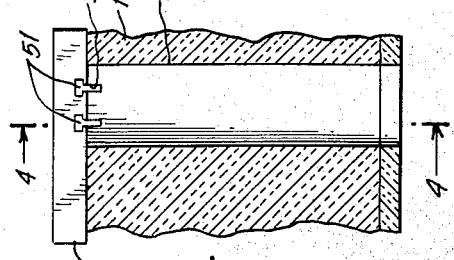

William L. Hanley, Greenwich, Conn.
(101 Park Ave., New York, N.Y.)

Filed July 12, 1956, Ser. No. 597,483

4 Claims. (Cl. 25—142)

The present invention relates to improvements in brick and tile kilns of the tunnel type and more particularly to improvements in the cooling sections of such kilns.

Tunnel type kilns to which the present invention relates are in effect an elongated kiln or oven, which may be of refractory material, through which bricks, tile or the like (referred to as ware) may be transported on cars for the purpose of pre-heating, firing, and cooling the kiln-fired ware to produce a finished product.

The tunnel kiln is divided longitudinally into a plurality of zones or sections in each of which the temperature, atmospheric conditions, and air circulation can be controlled to effect efficient heat treatment of the ware. The primary sections into which the kiln is longitudinally divided may be referred to as the pre-heat section, the firing section, and the cooling section.

The chief advantage of such a tunnel kiln resides in the fact that the various operations of heating, firing and cooling are performed in a continuous process thereby yielding a high volume of production with a minimum of handling of the ware. It should be noted that the continuous nature of the operation requires that the cars carrying the ware progress successively through the heating, firing and cooling sections. Normally the kiln is operated so that the tunnel is full of ware cars bumper to bumper in the tunnel. The tunnel is normally provided with rails on which the cars roll. At certain intervals a new car is pushed into the entrance of the kiln thereby ejecting a fully processed car of ware from the exit of the kiln.

From the foregoing description it may be seen that the production of the kiln is limited by the rate at which each of the three functions of heating, firing and cooling may be performed.

The present invention is primarily concerned with the cooling section of a tunnel kiln, but as has been explained the production of the kiln is limited by the rapidity with which the cooling function may be properly performed even though the heating and firing sections may be capable of greater production.

Obviously the time required for the cooling operation depends in part upon the temperature at which the ware enters the cooling section and the temperature to which it is desired to cool the ware by the time it is ejected from the kiln. The entrance temperature of the ware is substantially determined by the necessity for firing the ware at a particular temperature to produce a properly heat treated production.

There is some latitude in the exit temperature of the ware from the cooling section. For example, it is quite possible to allow the ware to cool from 300° F. or so to ambient temperature outside of the kiln without damaging the ware or reducing its quality. It is highly desirable, however, to have the ware ejected from the kiln at a temperature at which it can be handled safely and efficiently. If it is necessary to further cool the ware after it is removed from the kiln, the major advantages of continuous operation are lost.

It should be noted that the cooling of the ware is rather a critical operation. Too rapid cooling of the ware results in a serious weakening of the material, resulting in an inferior product. The critical nature of the cooling process is in reality too complex to adequately describe in a brief explanation, but it will suffice to say that rapid cooling is tolerable and even desirable within some temperature ranges, but much slower cooling is required in other ranges in order to produce finished ware of high quality.

From the preceding description of the general nature of tunnel kiln requirements and particularly of the function of the cooling section, it is obvious that the cooling section of a tunnel kiln should have a high cooling capability and that the temperature and volume of circulating air should be subject to accurate individual control in the various parts of the cooling section.

Another major consideration in the design of tunnel kiln cooling sections is the possibility of utilizing the heat energy given off by the ware in the process of cooling. A substantial item in the total production cost of brick and tile is the cost of fuel which is required to produce the ware. Obviously the ware gives up in cooling a major portion of the heat that was required to heat it. If a portion of this heat can be recovered and used, a substantial fuel savings can be realized. This consideration provides an additional reason for cooling the ware to a low temperature before it leaves the kiln since the heat present in the ware cannot be recovered after it has left the kiln.

An important factor in the efficient recovery of heat in the cooling section is the temperature of the heated exhaust air from the cooling section. In order to cool and transport the heated exhaust air to the point at which the heat is to be utilized, it is necessary to provide fans which, of course, require power, usually electrical power. If the temperature of the cooling section exhaust air is high (for example, 1000° F.) the mass of air which must be moved to transfer a given amount of heat energy is only approximately a third of the mass of air which would be required if it were at a lower temperature (for example, 300° F.). Greatly reducing the mass of air which must be transported reduces electrical power expenses and also may reduce the number of fans required for a given installation.

It is therefore an object of the present invention to provide a cooling section for a tunnel kiln wherein the exhaust air from which heat is to be recovered is released at a high temperature thereby requiring a minimum of electrical power to effect a high degree of heat recovery in the cooling section.

It is another object of the present invention to provide a tunnel kiln cooling section which because of its high degree of temperature control will effect a rapid cooling of the ware without damage or decrease in quality in the ware produced.

It is another object of the invention to provide a tunnel kiln cooling section in which a large amount of heat is recovered for further use.

It is still another object of the present invention to provide a tunnel kiln cooling section in which the temperature of the ware may be reduced to a low temperature at which it may be handled safely and efficiently.

It is a further object of the present invention to provide a tunnel kiln cooling section in which both the air temperature and the air volume of the circulating air may be controlled independently in each part of the cooling section.

It is a further object of the present invention to provide a barrier section at the entrance of the cooling section which substantially prevents passage of air between the firing section and the cooling section.

It is a further object of the present invention to provide a double walled housing for a tunnel kiln cooling section which allows passage of air between the walls to take up the heat from the housing of the cooling section.

It is a further object of the present invention to provide a tunnel kiln cooling section in which the temperature gradient through the section may be controlled with a very high degree of accuracy.

It is a still further object of the present invention to provide a tunnel kiln cooling section wherein the temperature of the circulating air may be accurately controlled so that a high volume of air may be circulated in the section without damaging or decreasing the quality of the ware.

Other objects and advantages of the present invention will be obvious from a consideration of the following description together with the drawings, in which:

Fig. 1 shows a top sectional view of a tunnel kiln cooling section taken along line 1—1 in Fig. 2, which cooling section due to its elongated nature has been divided into two parts for the purpose of illustration in Fig. 1;

Fig. 2 is a vertical sectional view taken along line 2—2 in Fig. 1;

Fig. 3 is a vertical sectional view taken along the line 3—3 in Fig. 1 and showing the entrance barrier of the cooling section;

Fig. 4 is a vertical sectional view taken along the line 4—4 in Fig. 1 and likewise showing the entrance barrier of the cooling section;

Fig. 5 is a vertical sectional view taken along the line 5—5 in Fig. 1 and showing an alternative embodiment of the tunnel kiln which includes a double-walled housing for the cooling section of the kiln.

As will be understood by those familiar with kilns of this type, the construction usually employs a suitable foundation and an overhead structural steel framework for supporting the kiln housing proper. The housing is normally constructed of brick and cementing materials, certain portions being constructed of refractory brick where necessary. Further reference to the materials of construction is deemed unnecessary in view of the fact that suitable materials are well known and the type of materials used does not form a part of the present invention.

There is shown at 11 a tunnel kiln cooling section with which the present invention is primarily concerned. A portion of the firing section of the kiln is shown at 12. Firing section and the pre-heating section which precedes the firing section do not form a part of the present invention and are not shown in the drawings. An understanding of the operation of a tunnel kiln pre-heating and firing section may be obtained from U.S. Patent 2,550,807 to W. L. Hanley, Jr.

A barrier or isolation section 13 is shown between the firing section 12 and the cooling section 11. The purpose of the barrier section 13 is to isolate the high temperature of the firing section 12 from the lower temperature of the cooling section 11 in a manner which will be further explained below. The cooling section 11 has a tunnel-like opening 14 throughout its length for the passage of ware. The ware 18 is customarily placed on rail cars 16 which are transported slowly on rails 17 through the kiln from the pre-heat section to the firing section and thence to the cooling section and out the exit of the kiln. It should be understood that the ware will pass through the cooling section shown in Fig. 1 from left to right. The kiln may be provided with doors at one or both ends of the kiln which may be opened to advance the ware cars.

A number of projecting walls 15 are provided in the cooling section to divide the cooling section into a series of compartments which are usually the length of one ware car. The projections 15 therefore restrict the longitudinal flow of air through the kiln and make it possible to maintain different temperatures in different compartments along the length of the cooling section. A number of cooling air inlets 19 are provided in the kiln between the projections 15. The inlet 19 communicates with a longitudinal air duct 21 in the wall of the cooling section. The air duct 21 in turn communicate through a branch duct 22 to a main inlet air duct 24. The main inlet air duct 24 is in communication with an output 35 of a fan or blower 31. The fan 31 is provided with a blade or impeller 32 connected to a rotatable shaft 33. The fan or blower 31 may be of any desired type and is, of course, provided with a power source such as an electric motor (not shown).

Each of the branch air ducts 22 is provided with a damper or valve 25 to control the amount of air passing from the main duct 24 into a particular branch duct 22 and thence into a particular compartment of the cooling section.

In Figure 2 it may be seen that the air entering through the inlet 19 will pass upward over the ware 18 and will be mixed with the air in the cooling section. The air in the cooling section will of course normally be warmer than the air introduced through the inlet 19 so that the amount of air introduced by a particular inlet 19 will control to some extent the amount of cooling that takes place in a particular part of the cooling section.

In Figure 1 there is shown at 26 an exhaust air passage in the wall of the cooling section 11. It should be pointed out that Figure 1 is a sectional view taken along the stepped line 1—1 in Figure 2 so that the passage 26 shown in Figure 1 is in the lower part of the wall of each side of the cooling section while the inlets 19 are in the upper part of the wall of each side of the cooling section. This may be seen very readily from Figure 2. A series of exhaust ports 27 are provided in the internal wall of the cooling section 11. These ports provide communication between the inside of the cooling section and the exhaust passage 26. A series of valves or dampers 28 are provided so that the exhaust passage may be closed and divided into two parts at one of several dividing points. Additional dampers 29 are provided at each exhaust port 27 for control of the air volume exhausted from that particular area of the cooling section.

The intake of the fans 31 communicates with two intakes ducts 36 and 37. The intake duct 36 is connected to an aperture 38 in the external wall of the cooling section 11 so that the intake of the fan 31 communicates with the exhaust passage 26 in the cooling section of the kiln. The intake duct 37 provides a source of cool air so that the temperature of the air at the output of the fan may be controlled. Intake 37 could of course open directly to the atmosphere. Other sources of cool air which may be conducted to the intake 37 will be discussed in connection with other features of the invention.

A second output duct 34 is provided on the fans 31. The output duct 34 provides a source of air which has been heated by the hot ware in the cooling section. This hot air is available from the cooling section to be used for other purposes in the ware processing operation such as drying, preheating, combustion air, and the like.

At 41 there are shown a second pair of fans or blowers similar to the fans 31. The fans 41 have impellers 42 connected to shafts 43 and would be provided with a motor or other source of power not shown in Figure 1. The fans 41 have outputs 44 and 45 and inputs 46 and 47.

Thus it may be seen that the fans 41 are similar to the fans 31 but are connected to the cooling section 11 at a point near the exit which would of course be a lower temperature point along the cooling section of the kiln.

The intakes 46 of the fans 41 are connected through the apertures 48 to the exhaust passage 26. The output of the fans 41 is connected to a main low temperature inlet duct 49. It should be noted that the main high temperature inlet ducts 24 communicate with a first or high temperature part of the cooling section while the low-temperature inlet ducts 49 communicate with the last or low temperature part of the cooling section. In the central portion of the cooling section both the high temperature ducts 49 and the low temperature ducts 24 communicate through the branch inlet ducts 22 to the cooling section inlets 19. Thus in the middle part of the cooling section air from the high temperature ducts 24 and from the low temperature ducts 49 may be mixed in any desired proportion by the adjustment of the dampers 25.

From the foregoing description it is obvious that in at least a portion of the cooling section 11 air of different temperatures may be mixed by the adjustment of the dampers 25 so that the temperature of the air passing through inlets 19 into the cooling section may be controlled. This control of the inlet air temperature may be accomplished substantially independently of the volume of air introduced into that particular portion of the cooling section.

It is obvious that a third set of fans or in fact any number of pairs of fans could be used each operating at a different temperature. It is also clear that while provisions for mixing the high temperature and low temperature air are shown only in the central portion of the cooling section in Figure 1, the main air ducts could be extended so that both the high temperature and low temperature main inlet ducts extended the full length of the cooling section and valves or dampers could be provided for mixing the high temperature air and the low temperature air throughout the length of the cooling section.

In Figure 3 there is shown a vertical section of the entrance barrier 13 of the cooling section. As previously mentioned the purpose of this entrance barrier is to isolate the cooling section 11 from the firing section 12 and to prevent the passage of air between the two sections. As may be seen in Figure 2 the side walls of the entrance barrier section are such that a minimum clearance is provided between the walls and a full load of ware 18 on a ware car 16. Two T-shaped transverse dividers 51 are provided in the roof of the barrier section 13 in order to reduce the height of the barrier section until it will just pass a loaded ware car thereby preventing excessive passage of air over the top of the ware car.

As may be seen from Figure 3 T-shaped slots 50 are provided in the barrier section 13 so that the transverse dividers 51 may be slid into place from outside the kiln and are retained in place by virtue of the horizontal projections on the T-shaped transverse dividers.

The dividers 51 are constructed of a frangible heat resistant material, preferably fire clay. Thus the dividers will resist damage from the high temperature of the firing section and they will also be sufficiently fragile so that a ware car bearing an abnormally high load of ware will break the dividing members 51 rather than becoming jammed in the kiln. In the event that the transverse dividers 51 are broken it is a very simple matter to withdraw any fragments and insert a new divider. It should also be noted that dividers having a projection of greater or lesser length might be used in order to accommodate ware car loads of different heights.

The dividers 51 are particularly effective in preventing the passage of air between the firing action and the cooling section due to the fact that any tendency toward an air-flow creates an eddy at the point where the air-flow strikes the divider 51 and the resistance to air-flow past the divider is substantially increased. This effect may be increased by the use of more than one divider as shown in Fig. 3. Although two dividers are shown in Fig. 3 a greater or lesser number could be used as desired.

Figure 5 illustrates the manner in which the high temperature ducts 49 and the low temperature ducts 24 are connected by the branch duct 22 to the inlet 19 of the cooling section. In addition Figure 5 shows an additional feature which may be incorporated into the tunnel kiln cooling section. This additional feature is a double wall in the top portion of the cooling section housing. Figure 5 with the double wall feature may be contrasted with Figure 2 having an ordinary housing without the double wall feature.

In Figure 5 a passage 52 is left in the upper portion of the cooling section wall so that a double wall is formed in the upper portion of the cooling section housing. A series of openings 53 are left at intervals along the cooling section. The openings 53 provide an opening from the space between the double wall 52 to the atmosphere outside the cooling section. The outside wall 54 extends upward to a point slightly above the top of the internal wall of the kiln. A plate 55 of sheet metal or other suitable material is placed over the top of the wall 54 thereby completing a double wall over the top of the cooling section. An air duct 56 is provided which communicates with a series of openings 57 in the top cover plate 55. Valves or dampers 58 are provided to control the air flow for each individual opening 57. The air duct 56 communicates with the intakes 47 to the low temperature fans or the intakes 37 to the high temperature fans, or both by means of a suitable air duct (not shown).

The double wall and the collector air duct 56 thus provides a means for passing air through the openings 53 into the space 52 between the double walls and through the openings 57 and the collector air duct 56 to the fans 31 and 41. This air flow serves several purposes in that it cools the cooling section housing, conserves the heat from the cooling section housing which would otherwise be lost and provides a source of relative cool air to the intake of the cooling fans 31.

Operation of a cooling section may be best described by explaining the manner in which the air may be circulated in the cooling section in such a manner to effectively cool the ware and at the same time conserve the heat given off by the cooling ware.

In the normal operation of the cooling section the ware enters from the firing section 12 through the barrier section 13 to the cooling section 11. In normal operation a solid line of trucks carrying ware progresses through the kiln in an unbroken stream. Obviously the ware first entering the cooling section is at its highest temperature having just emerged from the firing zone. This temperature may be on the order of 2000° F. It is therefore desirable that the air circulating around the ware with the first part of the cooling section be at a relatively high temperature. For this reason the air conducted to the inlets in the first part of the cooling section comes from the high temperature fan 31. This fan conveys high temperature air due to the fact that its intake 36 opens into the front end or the high temperature end of the exhaust passage 26. The high temperature end of exhaust passage 26 is separated from the low temperature end of the exhaust passage 26 by the insertion of one of the dividers 28. As may be seen from Figure 1 any one of a number of dividers 28 may be inserted so that the exhaust passage 26 may be divided at a point near to or farther from the entrance as may be desired.

The temperature of the air in the high temperature main inlet ducts 24 may be controlled by allowing a greater or smaller amount of cooler air to enter through the intake 37 and by allowing hot air to pass out through the output 34. As previously mentioned the output 34 serves to conduct air into a conduit where it is available as a source of heat in other operations of the ware producing process.

The cooler air at the intake 37 may come from the output of the low temperature fan or from the cooling duct 56 which draws air through the double wall of the cooling section housing.

It should be noted that a certain amount of cooler air from the low temperature fans 41 may be conducted into the cooling section on the high temperature side of the exhaust passage divider 28, and thus indirectly passing into the high temperature fan 31.

As the ware passes from the entrance of the cooling section toward the central portion of the cooling section and eventually reaches a point where the inlets 19 communicate with both the high temperature duct 24 and the low temperature duct 49. In this area of the cooling section the temperature of the inlet air can be precisely controlled by adjustment of the dampers 25 allowing any desired mixture of high temperature and low temperature air to pass into that particular part of the cooling section.

Toward the exit end of the cooling section the high temperature duct 24 terminates, and, thereafter, the temperature of that particular portion of the cooling section is controlled by adjustment of the volume of low temperature air emitted from the low temperature air duct 49.

The low temperature fan outlet 44 may be connected to the intake 37 of the high temperature fan 31. A considerable advantage accrues by this method of operation. A typical operating temperature for the output of the high temperature fans might be 1000° while a typical operating temperature for the output of the low temperature fans might be 300° F. If the air from the low temperature fan at 300° F. is fed into the intake of the high temperature fan it is then possible to raise the temperature of all exhaust air to approximately 1000° for use in other phases of the ware processing operation.

It is highly desirable that air from the cooling section which is to be utilized in other phases of the operation be withdrawn from the cooling section at the highest possible temperature. A considerable amount of electrical energy is required to convey the heated air to the point of use and it is obvious that a given mass or weight of 1000° air will contain more heat than the same mass or weight of 300° air. This means that to conserve a given amount of heat it is necessary to move a much lesser mass of air when it is possible to obtain the air at higher temperatures.

On some occasions it might be desirable to have a source of low temperature air and in such a case the output by the low temperature fans 41 could be used directly rather than being conducted into the high temperature fan intake 37.

The intake 47 of the low temperature fans may be connected by means not shown to the collecting duct 56 which communicates with the space between the walls in the cooling section housing shown in Figure 5. By using this means of cooling the heat given off by the housing is conserved and is eventually available in the exhaust air of the cooling section.

In the event that the double wall housing construction is not used the intake 47 of the low temperature fans may of course be open to the atmosphere to provide a means of regulating the temperature of the air at the low temperature fans.

Thus it may be seen that the cooling section shown in Figure 1 provides an apparatus for recirculating cooling air from low temperature areas to high temperature areas finally exhausting it at a high temperature conducive to efficient recovery of the heat contained in the air. It is likewise apparent that a very high degree of control of both the temperature and the volume of the air admitted into particular sections of the cooling section may be achieved.

Although a particular structure has been described, it should be understood that the scope of the invention should not be considered to be limited by the particular embodiment of the invention shown by way of illustration, but rather that the scope of the invention is limited solely by the appended claims.

What is claimed is:

1. In a tunnel kiln, a cooling section comprising: an elongated housing forming a tunnel through which stacks of ware to be cooled may be moved, a plurality of air circulating means for repeatedly recirculating cooling air in separate sub-sections of said cooling section, means for interconnecting said air circulating means for mixing air from each, valve members for controlling the quantity and temperature of air transferred between said air circulating means, and means for delivering said mixed air into said tunnel at a plurality of points to provide different temperature differentials between the ware in said sub-sections and the mixed cooling air delivered at said points.

2. In the combination of claim 1 said air circulating means comprising a pair of duct systems each having a plurality of branches connected to said tunnel at longitudinally spaced points, some of the branches of each of said duct systems being located at the same points longitudinally.

3. In the combination of claim 1 said air circulating means comprising a pair of duct systems each having a plurality of branches connected to said tunnel at longitudinally spaced points, some of the branches of each of said duct systems being located at the same points longitudinally and fans having their outputs connected to said duct systems respectively and their inputs connected to said tunnel.

4. In the combination of claim 1 said tunnel kiln having an exhaust duct opening into said tunnel at a plurality of longitudinally spaced points, dampers in said duct between said points, said circulating means comprising a pair of supply ducts having branches connected to said kiln at longitudinally spaced points, some of the points of connection of each of said supply ducts lying at the same points longitudinally, and fans respectively connected to said supply ducts on their exhaust sides of said fans respectively and to said exhaust duct on their intake sides respectively, whereby the dampers in said exhaust duct individually control the temperature of the air going to the intakes of said fans respectively.

References Cited in the file of this patent

UNITED STATES PATENTS

| | | |
|---|---|---|
| 1,505,768 | Dressler | Aug. 19, 1924 |
| 1,510,556 | Owens | Oct. 7, 1924 |
| 1,556,208 | Dressler | Oct. 6, 1925 |
| 1,701,223 | Bergman | Feb. 5, 1929 |
| 1,918,962 | Geer | July 18, 1933 |
| 2,203,182 | Rendall | June 4, 1936 |
| 2,335,128 | Merrill | Nov. 23, 1943 |
| 2,550,807 | Hanley | May 1, 1951 |